(12) United States Patent
Yang et al.

(10) Patent No.: US 10,621,370 B2
(45) Date of Patent: Apr. 14, 2020

(54) METHODS AND APPARATUS TO PROVIDE GROUP-BASED ROW-LEVEL SECURITY FOR BIG DATA PLATFORMS

(71) Applicant: Intel Corporation, Santa Clara, CA (US)

(72) Inventors: Chih-Yuan Yang, Portland, OR (US); Yi Gai, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 796 days.

(21) Appl. No.: 15/166,922

(22) Filed: May 27, 2016

(65) Prior Publication Data

US 2017/0344749 A1 Nov. 30, 2017

(51) Int. Cl.
*G06F 21/62* (2013.01)
*H04L 29/06* (2006.01)
*G06F 16/25* (2019.01)
*G06F 16/9535* (2019.01)

(52) U.S. Cl.
CPC .......... *G06F 21/6209* (2013.01); *G06F 16/25* (2019.01); *G06F 16/9535* (2019.01); *H04L 63/101* (2013.01); *G06F 2221/2141* (2013.01)

(58) Field of Classification Search
CPC .... G06F 21/606; G06F 21/31; G06F 21/6218; G06F 21/10; G06F 21/14; G06F 2221/2133; G06F 13/4059; G06F 16/44
See application file for complete search history.

(56) References Cited

U.S. PATENT DOCUMENTS

| | | | |
|---|---|---|---|
| 5,787,428 A * | 7/1998 | Hart | G06F 21/6227 |
| 7,134,022 B2 | 11/2006 | Flyntz | |
| 8,732,856 B2 * | 5/2014 | Sack | G06F 21/6227 |
| | | | 707/783 |
| 2006/0277341 A1 | 12/2006 | Johnson | |
| 2008/0154873 A1 * | 6/2008 | Redlich | G06F 16/951 |
| 2009/0043775 A1 | 2/2009 | Cotner et al. | |
| 2011/0145908 A1 | 6/2011 | Ting | |
| 2011/0258438 A1 | 10/2011 | Hildebrand | |

(Continued)

OTHER PUBLICATIONS

The International Bureau, "International Preliminary Report on Patentability", issued in connection with PCT patent application No. PCT/US2017/029118, dated Nov. 27, 2018, 9 pages.

(Continued)

*Primary Examiner* — Angelica Ruiz
(74) *Attorney, Agent, or Firm* — Hanley, Flight and Zimmerman, LLC

(57) ABSTRACT

Methods, apparatus, systems and articles of manufacture are disclosed to facilitate electronic data security. An example apparatus includes a data storage including a memory adjusted to store data organized according to a data table including columns identifying a first data record and a first security tag associated with the first data record. In the example apparatus, retrieval of data from the data storage involves a bit operation comparing the first security tag with a first privilege tag. In the example apparatus, the data storage provides the first data record when the bit operation comparing the first security tag with the first privilege tag has a non-zero result, and the data storage does not provide the first data record when the bit operation comparing the first security tag with the first privilege tag has a zero result.

29 Claims, 12 Drawing Sheets

(56) References Cited

U.S. PATENT DOCUMENTS

2014/0365527 A1* 12/2014 Fuchs ................. G06F 21/6227
707/786
2015/0156206 A1* 6/2015 Redlich ................. G06Q 10/10
726/29

OTHER PUBLICATIONS

International Searching Authority, "Search Report", issued in connection with PCT patent application No. PCT/US2017/029118, dated Jul. 20, 2017, 5 pages.
International Searching Authority, "Written Opinion", issued in connection with PCT patent application No. PCT/US2017/029118, dated Jul. 20, 2017, 8 pages.

* cited by examiner

METHODS AND APPARATUS TO PROVIDE GROUP-BASED ROW-LEVEL SECURITY FOR BIG DATA PLATFORMS

FIELD OF THE DISCLOSURE

This disclosure relates generally to electronic data security, and, more particularly, to methods and apparatus to provide group-based, row-level security for big data platforms.

BACKGROUND

"Big data" refers to data sets that are too large or complex for traditional data processing applications to properly analyze them. Challenges to processing big data include analysis, capture, data curation, search, sharing, storage, transfer, visualization, querying, updating and information privacy. The large scale of big data and associated applications, infrastructures, and data repositories presents unique challenges for security. As big data and associated analytics become more widely used, security and data protection concerns increase in importance.

Big data sets are growing rapidly in part because they are increasingly gathered by cheap and numerous information-sensing mobile devices, aerial devices (e.g., remote sensing), software logs, cameras, microphones, radio-frequency identification (RFID) readers, wireless sensor networks, etc.

In a big data environment, large data size necessitates that the data is distributed and stored in multiple nodes/servers. A data format used by nodes/servers may be semi-structured or have no structure at all (e.g., a plain text file). Unlike a traditional relational database, big data storage provides no index support, so search and retrieval to find a subset of data is usually a slow process. Additionally, due to privacy concerns, a user may only be authorized to see a small portion of the available data.

DETAILED DESCRIPTION

Figure 1:
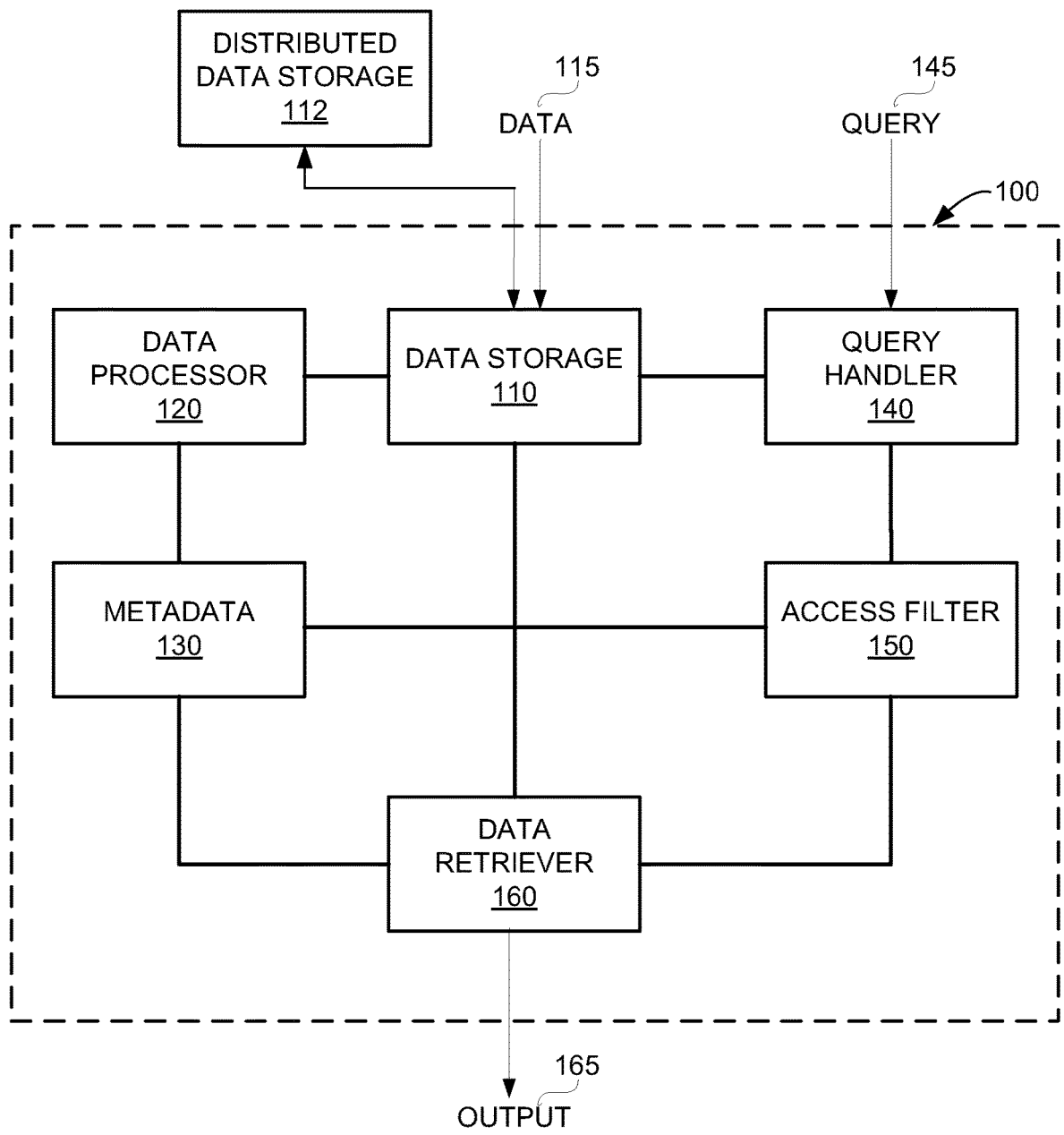
FIG. 1 illustrates an example data storage and retrieval system.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

In many databases (e.g., with "big data"), a large number of records presents significant time and resource challenges when a program or processor is to retrieve a subset of those records based on some criterion. Certain examples provide a fast, group-based, row-level security mechanism that allows fast filtering and data retrieval for a big data platform (e.g., Apache Hadoop, etc.). Certain examples organize unindexed data in columnar format with security tags to retrieve underlying data records from a subset of query results.

In certain examples, to filter a subset of records from a large data set, each data record can be tagged, and each user can be assigned a privilege tag or other security label. A subset of records can be retrieved by scanning a whole data set and returning records with matched tags. However, both whole data set scanning and tag matching are slow processes, especially when there are many groups listed in the security tags. As a result, it is a challenge to quickly filter a large data set to retrieve a subset of records. Instead, certain examples provide systems and methods to reduce tag size and enable faster filtering of records by avoiding a whole data set scanning while still supporting a reasonable number of user groups with security tags. For example, a user can be allowed to see his/her own records, and a security mechanism can be provided to search and filter records and return a subset of the data based on the user's specific privilege.

Data can be organized according to column, rather than according to a traditional row-by-row data table arrangement. More specifically, if data in a relational table is grouped together according to what row the data is in, then the database manager is called "row-based" or a "row store." If data is grouped together according to what column the data is in, then the database management system is called "columnar" or a "column store."

A columnar data store serializes data values of a column together for storage. By storing data in columns rather than rows, a data repository and/or other data store can more precisely access data of interest to answer a query rather than scanning and discarding unwanted data in rows. For example, a query of a large, unindexed database involves reading every row and, therefore, reading every byte of the data from the disk(s) on which the data is stored as the query analyzes every row to identify information matching the query. Conversely, columnar data can be queried to identify data records matching a particular column type/category (e.g., patients at a certain hospital, patients with a certain condition, etc., where the criterion classifies the column). As opposed to further analyzing an entire record row, records satisfying the column criterion can be returned without further analysis of the record. Data can also be organized in a row/column hybrid storage format, such as by storing as many rows of data as can fit into a block, but within the block store the data in columns.

Disk storage capacity, disk read time, input/output (I/O) bandwidth limit performance of queries to large "big data"

sets. By improving a ratio of useful bytes read to total bytes read through columnar data organization and query, query performance can be improved through better usage of disk read time and I/O bandwidth. A smaller amount of the available data is analyzed to satisfy a query of columnar data when compared to row-based data. Disk storage capacity can also be leveraged with columnar storage by storing column values densely and contiguously on disk to utilize efficiencies in sequential disk drive reads. Whereas a row is split across several column blocks and may involve separate files on disk, reading a column involves a seek to the column location and a contiguous read of the column data, for example.

Stored data can be compressed according to a variety of compression schemes. In certain examples, there are two main kinds of compression—compression of bit strings and compression of actual data values. Compression of actual data values can be referred to as columnar compression because different columns of data can be compressed in different ways, often depending only on the data in that column. Since each column includes similar data (e.g., a same type of data), similarity (and difference) between adjacent data can be used to represent that data as a common value plus a difference marker (e.g., storing what is common between the data values plus a smaller (e.g., one bit, two bit, etc.) indication of how the adjacent data differs from the base data value). Sorting data by column (e.g., by gender, age, name, type, location, etc.) can also generate further opportunities for compression of similar adjacent data.

Compressed data must often be uncompressed, however, in order to be searched. Uncompressing data for searching can be a time- and resource-consuming task. Certain examples facilitate search of columnar data in a data store without uncompressing the stored data.

Using an easy-to-analyze identify, columnar data records can be analyzed while in compressed form. Certain examples provide a group-based row-level security mechanism that allows fast filtering and data retrieval. Using bit map tags, for example, data records can be analyzed for applicability to a query without uncompressing the contents of the record itself. In certain examples, a user is assigned a privilege tag, and a data record is assigned a security tag.

In certain examples, a bit map can be used as a security tag for a data record. Rather than using a string as a security tag (e.g., group1, group2, etc.), a long integer, for example, can be used to represent a group list (e.g., 011, etc.). The long integer can be treated as a bit map, for example. A location of a bit in the bit map represents a group, and a value at that location represents and access right (e.g., a '1' indicates the group has access, a '0' indicates the group does not have access, etc.). A size of a bit map tag may be smaller than a size of string tag (e.g., one or two bytes, etc.), assuming that a total number of groups is limited. In certain examples, different types of bit maps can be provided to reduce the total tag size. For example, if a data record belongs to "department1" only, the record can be tagged with a bit map for "department1" only. A bit map for one department is smaller than a bit map for an entire company, for example.

In certain examples, a string comparison is replaced by an integer "bit AND" operation for data record filtering. A bit operation is faster than a string comparison. When a security tag is in bit map format, filtering of data records can be done by an integer "bit AND" operation between the security tag and a user's privilege tag. If an output of the bit AND operation is greater than zero, then access is granted to the user. If the output of the bit AND operation is zero, then access is denied to the user. Using the security tag with data in columnar format, for example, a processor can quickly filter available data records and only retrieve the security tag column for a fraction of the results (e.g., to get a thousand results out of millions of records, etc.).

In an example big data platform, the data record is associated with a comma-separated string. To filter records from the big data set, a regular expression or loop is traditionally used to match names as defined in the text strings. However, a loop string comparison or regular expression analysis is a costly process. In an example, a bit map analysis of 2-3 million data records and 2-10 security tag groups resulted in a performance improvement of at least 10 times faster than analysis using a comma-separated string list. Certain examples provide a performance 10 to 100 times faster than when querying data using a string without any columnar storage.

Certain examples reduce total I/O volume. As discussed above, I/O is slow in today's computer systems, especially on big data platforms. Certain examples keep the data records in a compressed format and in columnar storage (e.g., Apache Parquet, etc.). Data compression reduces a data size on physical disk, for example, which decreases data traffic between disk and system memory, for example. Also, columnar storage saves data records (e.g., rows) in a contiguous collection of column values. When retrieving security tag data, the data can be loaded in a continuous wave from disk which avoids random I/O activity and does not load an entire data set (e.g., loads the security tag field only, etc.). Without loading the entire data set, the filtering process is sped up (e.g., using Apache Hadoop, Spark, and Parquet, etc.).

In a big data platform, record sizes are normally large, and indexing by column is not available. The data is traditionally stored in row storage or plain text format and may or may not be compressed. Without columnar storage, filtering records using the security tag involve loading the entire record before locating the security tag. If most of the records do not pass the filtering condition, loading all of each data record into memory to facilitate the filtering process is very inefficient and consuming of time and resources.

In certain examples, metadata is used to define bit maps (e.g., long integers, etc.) for groups. User (e.g., group member) security tags and data record privilege tags are built based on the group bit maps. For example, metadata includes: 1) a group table to store group name(s) and associated bit map(s), 2) a user table to store user identifier (s) (ID) and associated privilege tag(s) indicating a bit map group(s) to which each user belongs, 3) a security tag associated with each data record indicating a bit map of group(s) that can access the data record.

Certain examples provide a group table, including a bit map (e.g., a long integer or binary string). Each bit belongs to one group (e.g., 1, 2, 3). For example, group1 is associated with the rightmost bit, group2 is associated with the second bit, etc. The bit is a tag for the corresponding group. Using the bit map, a large number of groups (e.g., 1,000, etc.) can be identified in a single string. A value of "1" indicates that the corresponding group has a privilege, and a value of "0" indicates that the corresponding group has no privilege.

FIG. 1 illustrates an example data storage and retrieval system 100. The example system 100 includes a data storage 110, which receives data 115 to be input into the data storage 110. In certain examples, the data storage 110 is distributed beyond the example system 100 to include distributed data storage 112 (referred to collectively with the data storage 110 herein). The data storage 110 is associated with a data processor 120 to process the input data 115 into one or more data records for storage in the data storage 110. For example, the data processor 120 converts the input data 115 into columnar format (e.g., rather than row format, etc.). The data processor 120 also adds a column to the data record(s) formed from the input data 115 to insert an identifier (ID) or key, a security tag, etc., into the data record. In certain examples, rather than storing the security tag inside the data, the security tag is separated from the data to store the security tag in one column and store the data in another column for easier search and analysis. The data processor 120 compresses the data (e.g., using Apache Parquet, etc.) for storage in the data storage 110. The data processor 120 facilitates storage of the columnar formatted, tagged, compressed data record in the data storage 110. In certain examples, the data processor 120 is integrated with the data storage 110.

Based on its processing of the input data 115 into data records for storage, the data processor 120 generates metadata 130. The metadata 130 includes information describing and/or otherwise characterizing the data stored in the data storage 110 as well as user(s)/group(s) of uses allowed to access stored data. For example, the metadata 130 can include a table identifying groups, a user table indicating user membership in the group(s), and a data record table providing information about data records stored in the data storage 110 in columnar format.

The metadata 130 stores the group table to correlate each group name 110 and its associated bit map, for example. The metadata 130 stores the user table to correlate each user ID with a privilege tag and associated group(s), for example. The metadata 130 stores the data table to correlate data records with an ID/key and a security tag to be used in filtering the data stored in the data storage 110 for relevant, accessible results, for example. In certain examples, the metadata 130 is integrated with the data storage 110.

Figure 2A:
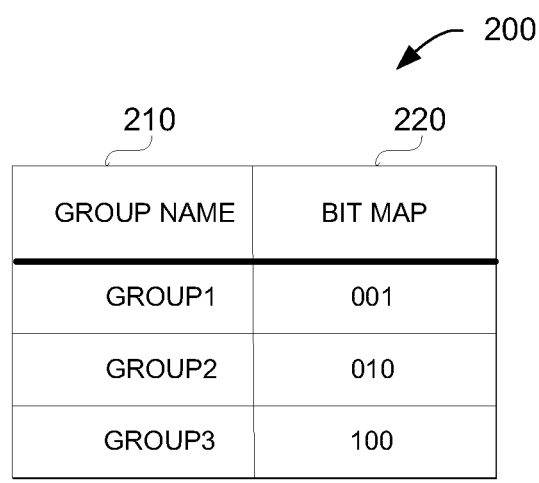
FIGS. 2A-B illustrate example group tables associating group names and bit maps.
Figure 2B:
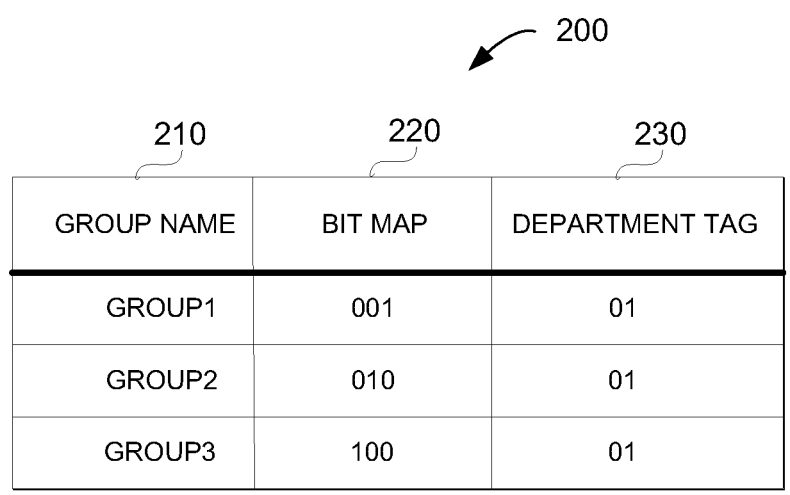

As shown in the example of FIG. 2A, a group table 200 includes a group name 210 and a bit map 220 associated with each group. The example of FIG. 2B shows an alternate implementation of the group table 200 including the group name 210, bit map 220, and a department tag 230. The bit map 220 identifies the group name 210 according to a long integer and/or other series of bits. The optional department tag 230 identifies a department and/or other organizational unit associated with the group name 210.

In the example of FIG. 2A, group1 is associated with a bit map 220 of '001', group2 is associated with a bit map 220 of '010', and group3 is associated with a bit map 220 of '100'. In the example of FIG. 2A, the group bit map 220 has three bits corresponding to the three available groups 210. If there were four groups 210, then, according to the naming convention of FIG. 2A, there would be four bits to the bit map 220, with each group's bit map 220 having a single '1' corresponding to its group number 210. Thus, the bit map 220 correlates the group name 210 with an integer identifier for bit operations.

The group table 200 can, optionally, include a department tag 230 to provide further hierarchy in organizing users. In the example of FIG. 2B, all three groups 210 are associated with the (optional) department tag 230 of '01', which indicates that all of the groups 210 are in the same department 230. If a group 210 was a member of a different department, that group's department tag 230 would reflect the difference (e.g., the department tag 230 would be '10' rather than '01', etc.).

Figure 3A:
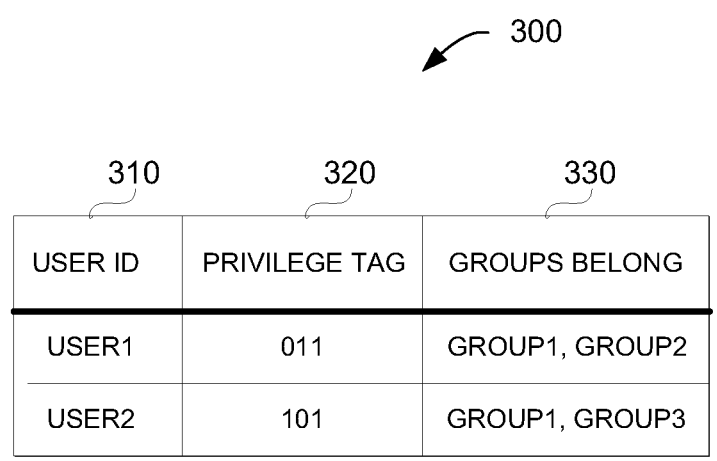
FIGS. 3A-B illustrate example user tables associating users with group names.
Figure 3B:
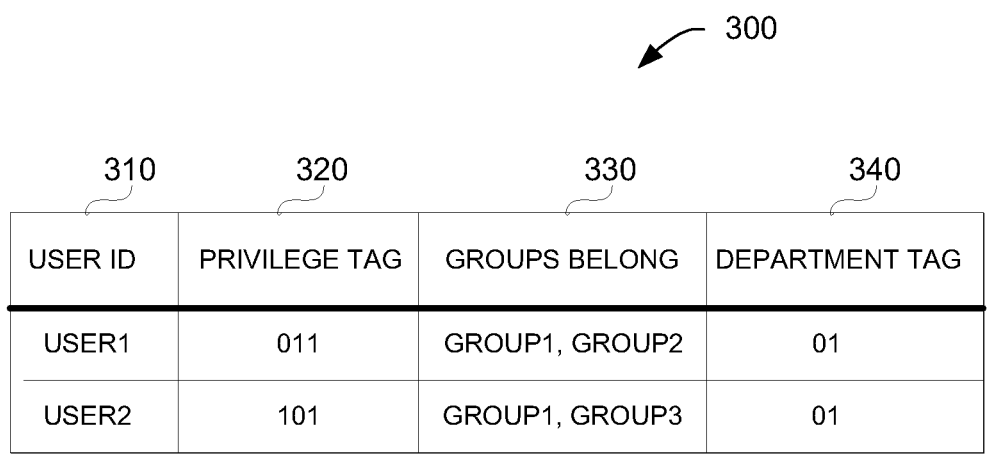

In certain examples, a user is assigned to one or more groups in a user table. FIG. 3A illustrates an example user table 300 including a user ID 310, a privilege tag 320, an indication of groups to which the user belongs 330. FIG. 3B shows an alternate implementation of the user table 300 including the user ID 310, privilege tag 320, group(s) indication 330, and a department tag 340.

As shown in the example of FIG. 3A, user1 has first and second bits (011) in its privilege tag 320, which indicates that user1 belongs two and/or otherwise has rights to 330 the first and second groups. That is, in the example of FIG. 3A, user1 belongs to group1 and group2 because its privilege tag 320 is '011', with the '1' in the first bit position of the privilege tag 320 indicating that user1 belongs to group1, the '1' in the second bit position of the privilege tag 320 indicating that user1 belongs to group2, and the '0' in the third bit position of the privilege tag 320 indicating that user1 does not belong to group3. The example of FIG. 3B adds a department tag 340 to provide further organizational hierarchy among user IDs 310, if desired and/or indicated. Thus, using the examples of FIGS. 3A-B and FIGS. 2A-B, a user 310 can be correlated with a privilege tag 320 which indicates associated group access 330, where each group is defined in the group table 200 such that each group name 210 is associated with a bit map 220 (and, optionally, with a department tag 230).

Figure 4A:
FIGS. 4A-B depict example data tables including a plurality of data records organized according to an identifier and a security tag.
Figure 4B:
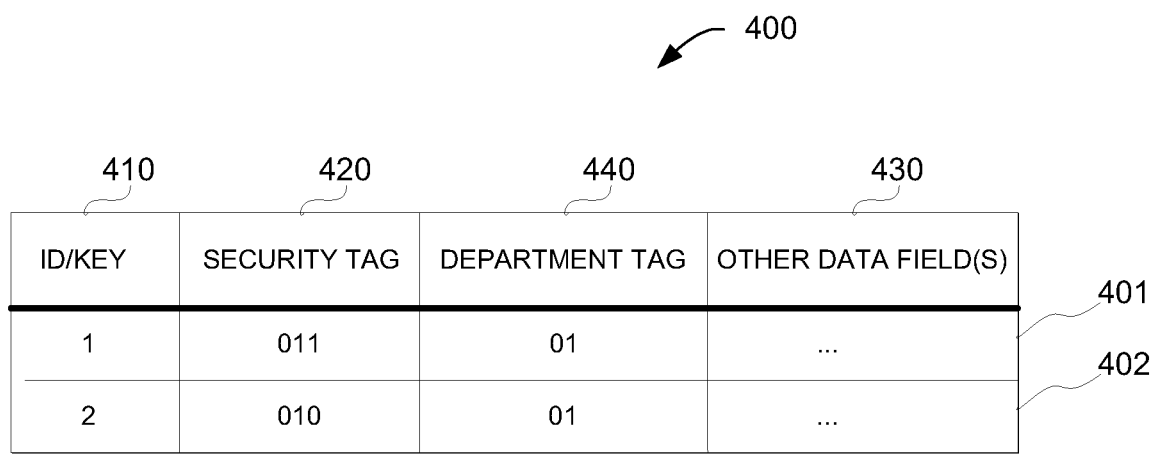

FIG. 4A depicts an example data table or text file 400 including a plurality of data records 401, 402. As shown in the example data table 400, each row or record 401, 402 is organized according to an identifier (ID) or key 410, a security tag 420, and (optionally) one or more other data fields. The example of FIG. 4B shows the data table 400 with an additional field for department tag 440 to provide further hierarchy, if desired and/or enabled.

In the example data table 400, record ID 1 401 has a security tag 420 of '011', in which the first bit indicates group1, the second bit indicates group2, and the third bit indicates group3. The example security tag 420 of '011' indicates that groups 1 and 2 can access that record (e.g., those bits have a value of '1' in the security tag 420) but group 3 cannot (e.g., the third bit of the security tag 420 is '0').

In the example data table 400, record ID 2 402 has a security tag 420 of '010', in which the first bit indicates group1, the second bit indicates group2, and the third bit indicates group3. The example security tag 420 of '010' indicates that groups 1 and 3 cannot access that record (e.g., those bits have a value of '0' in the security tag 420) but group 2 can access the record 402 (e.g., the second bit of the security tag 420 is '1').

Thus, a tag and/or other notation 420 is used to identify which record 410 can be accessed by which group 210. In certain examples, a binary 'AND' operation of security tag 420 and privilege tag 320 is executed for a given user 310, and, if the result is nonzero, then that user has permission to access that record. If the result of the AND operation is zero, then the user cannot access that record.

For example, user2, whose privilege tag 320 from the example of FIGS. 3A-B is '101', is determined to have access to the first data record 401 because conducting an AND operation using user2's privilege tag 320 of '101' and the data record 401 security tag 420 of 011 yields: 101 AND 011=001, which is a non-zero value. The non-zero result of the AND operation indicates that user2 has permission to access the data record 401. However, when comparing user2's privilege tag 320 to the security tag 420 of data record 402, the operation yields: 101 AND 010=000, which is a zero value. The zero result of the AND operation indicates that user2 does not have permission to access the data record 402.

The example system 100 includes a query handler 140 to process an incoming query 145 of data records in the data storage 110. The incoming query 145 includes query term(s) and a user ID. The query handler 140 parses the query 145 to 1) identify query terms (e.g., location, type, other keyword, etc.) and 2) identify a privilege tag for the querying user (e.g., based on user ID). The query handler 140 queries the data storage 110 for records corresponding to the terms of the query 145. Queries can be performed by column based on a field of interest, for example.

The example system 100 includes an access filter 150 that works with the query handler 140 and the metadata 130 to process the query results to filter out results for which the querying user does not have access. In some examples, the order may be reversed to first filter data records based on user privilege and then query those results based on the query terms.

The access filter 150 retrieves the security tag 420 from a column in the data table 300 associated with the data records in the metadata 130 retrieved by the query handler 140 from the data storage 110. The data records can remain compressed for this retrieval. The access filter 150 compares the security tag 420 for a given data record to the privilege tag 320 associated with the querying user. Using a bit or bitwise operation, the bits of the security tag 420 and the privilege tag 320, which are of equal length, are compared using a logical AND operation in which a '1' is provided in a bit position of the comparison only if the corresponding bit position in both the security tag 420 and the privilege tag 320 is also '1'. If the corresponding bit position in either tag 320, 420 is '0', then the output of the AND operation is also '0'.

Thus, for example, if the security tag 420 for the querying user has a value of '0101' and the privilege tag 320 for a resulting data record has a value of '0011', then the access filter determines that the outcome of '0101' AND '0011'='0001' indicates that because the user is a member of group1 and the privilege tag 320 allows access to group1, that data record can be included in the query results for this user. In another example, if the security tag 420 is '0101' and the privilege tag 320 is '1010', then the comparison yields '0101' AND '1010'='0000', which indicates that the user does not belong to any groups conveying access to that data record. The data record is then excluded from the query results to be provided to the user.

The example system 100 also includes a data retriever 160 that retrieves data records from the data storage 110 based on the query results from the query handler 140 as filtered by the access filter 150. That is, for the query results to which the access filter 150 determines the querying user has permission to access, the data retriever 160, alone or in conjunction with the data processor 120, retrieves the corresponding data records from the data storage 110 based on the ID or key 410 associated with each of the data records 401, 402. In the example of FIG. 4A, if the querying user was a member of group2 and, therefore, had access to records 401 and 402 as shown in the data table 400, the data retriever 160 would retrieve records 401, 402 from the data storage 110 using the keys 410 associated with each record 401, 402. The data retriever 160 then forms an output 165 of the retrieved data records 401, 402 to provide to the user in response to the query 145. The querying user can be a computer or other processing system, a software program, an operator, etc.

While example implementations of the system 100 and the data tables 100, 200, 300 are illustrated in FIGS. 1-4, one or more of the elements, processes and/or devices illustrated in FIGS. 1-4 may be combined, divided, re-arranged, omitted, eliminated and/or implemented in any other way. Further, the example data storage 110, data processor 120, metadata 130, query handler 140, access filter 150, data retriever 160, and/or, more generally, the example systems 100, 200, 300, and/or 400 of FIGS. 1-4, may be implemented by hardware, software, firmware and/or any combination of hardware, software and/or firmware. Thus, for example, any of the example data storage 110, data processor 120, metadata 130, query handler 140, access filter 150, data retriever 160, and/or, more generally, the example systems 100, 200, 300, and/or 400 of FIGS. 1-4 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data storage 110, data processor 120, metadata 130, query handler 140, access filter 150, data retriever 160, and/or, more generally, the example systems 100, 200, 300, and/or 400 of FIGS. 1-4 is/are hereby expressly defined to include a tangible computer readable storage device or storage disk such as a memory (e.g., a read only memory (ROM), hard drive, flash memory, other volatile and/or non-volatile memory, etc.), a digital versatile disk (DVD), a compact disk (CD), a Blu-ray disk, etc. storing the software and/or firmware. Further still, the example systems of FIGS. 1-4 may include one or more elements, processes and/or devices in addition to, or instead of, those illustrated in FIGS. 1-4, and/or may include more than one of any or all of the illustrated elements, processes and devices.

Flowcharts representative of example machine readable instructions for implementing the systems 100, 200, 300, and/or 400 of FIGS. 1-4 are shown in FIGS. 5-8. In these examples, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowcharts illustrated in FIGS. 5-8, many other methods of implementing the example systems 100, 200, 300, and/or 400 may alternatively be used. For example, the order of execution of the blocks may be changed, and/or some of the blocks described may be changed, eliminated, or combined.

As mentioned above, the example processes of FIGS. 5-8 may be implemented using coded instructions (e.g., computer and/or machine readable instructions) stored on a tangible computer readable storage medium such as a hard disk drive, a flash memory, a ROM, a CD, a DVD, a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 5:
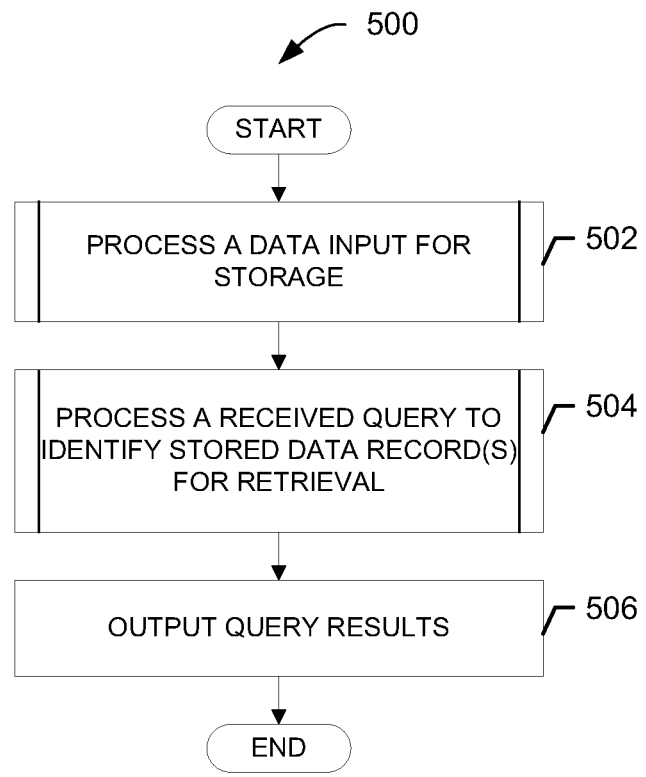
FIGS. 5-8 are flowcharts representative of example machine readable instructions that may be executed to implement the example systems of FIGS. 1-4.

FIG. 5 illustrates a flow diagram of an example method 500 to alter data and alter a data storage to improve querying and processing of data. The program 500 of FIG. 5 begins at block 502, at which a data input 115 is processed for storage in the data storage 110. The data can be input from a variety of sources and the type of data to be input does not matter. In certain examples, the data is columnized by the data processor 120 to store a data record in one or more columns and a security tag 420 associated with the data record in another column. The security tag 420 is provided with the data input (e.g., as an associated tag, parameter, header information, metadata, field, etc.) and/or can be generated for the data input based on an analysis of the type, source, content, submitting user, etc., of the data input. The security tag 420 indicates which user(s) and/or group(s) of users can access the data. The data input 115 is stored as a data record (e.g., a row of data) in the data storage 110 in conjunction with a data table 400 stored in metadata 130, and the security tag 420 and data field(s) 430 are stored in the data table 400 in association with an identifier 410 of the data record.

At block 504, a received query 145 is processed by the query handler 140 to identify stored data record(s) for retrieval. In certain examples, the query 145 includes one or more search terms as well as an identification of a querying user (e.g., a username, identification code, and/or other qualification associated with the querying user/group/system. The query search terms can be used to query one or more columns 430 of the data table 400 to identify data records 401, 402 corresponding to the query search terms. Those data records 401, 402 can then be analyzed to compare the security tag 420 associated with each data record 401, 402 to the privilege tag 320 associated with the querying user. The querying user can be identified by searching the table 300 for the user ID 310 provided in the query and retrieving the privilege tag 320 associated with the identified user ID 310. A bitwise operation (e.g., AND) between the security tag 420 and the privilege tag 320 determines whether the user is allowed to access the identified data records 401, 402.

Based on the bit operation, some or all of the identified data records 401, 402 are retrieved from provided as query results. For example, if the querying user is allowed to access data record 401 but not data record 402, based on the AND operation between bits of the security tag 420 and privilege 320, data record 401 is output as part of the query results while data record 402 is not provided as the output. Based on the bitwise processing, eligible data record(s) are retrieved from the data storage 110 based on the record index 410 associated with each record.

At block 506, the query results are output 165. For example, retrieved data records that have been determined to be authorized for access by the querying user. The query results can be output 165 by displaying the results, sending the results to another application, storing the results in a data storage, etc. In certain examples, the query results can be provided as data records alone and/or in conjunction with a data table, such as the example data table 400, providing metadata and organization to the query results.

Figure 6:
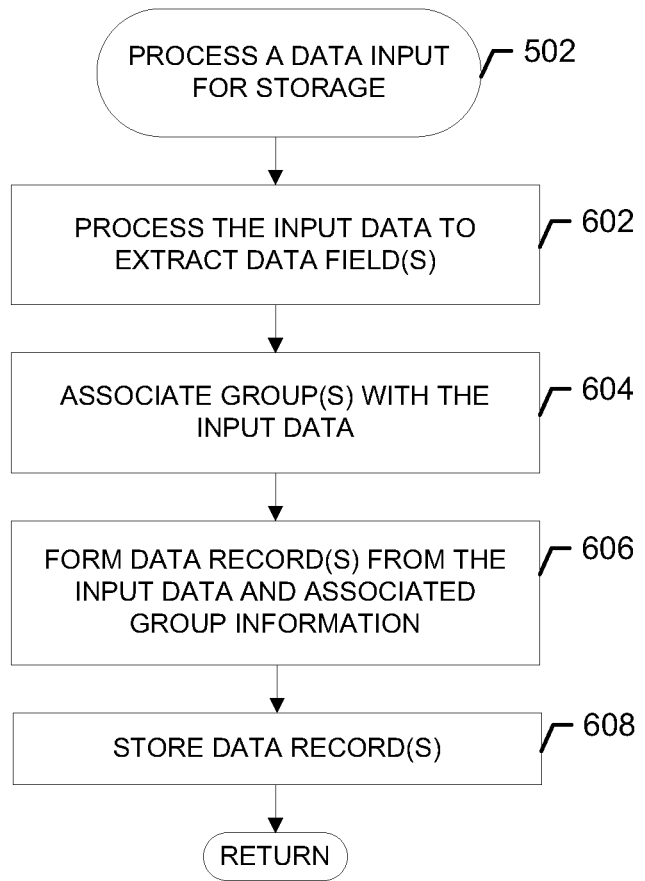

Additional detail associated with the processing of a data input for storage (block 502) is shown in the example of FIG. 6. At block 602, the input data 115 is processed by the data processor 120 to extract data field(s). The data fields include a user/group identification and query search term(s). The data processor 120 organizes the extracted data into a columnar data record. The data can be compressed and/or uncompressed data, for example.

At block 604, one or more groups are associated with the input data 115. For example, the user/group identification can be correlated by the data processor 120 with the user ID 310 in the example data table 300. Based on the user ID 310, one or more groups 330 to which the user/type of user/group of users belongs can be retrieved. The identification of authorized group(s) 330 is used to determine associated bit map(s) 120 from the example group table 100. The bit map 220 for each group 210 is used to determine the security tag 420 to be associated with the input data to be stored as data records in the data storage 110.

At block 606, a data record is formed from the input data 115 and the associated group information. For example, the data processor 120 forms one or more data records from the security tag 420 associated with authorized group(s) 210, 330 and data for the data field(s) 430. Each data record is associated with a record ID or key 410.

At block 608, the data record is stored by the data processor 120 in the data storage 110. Entries associated with each data record 401, 402 are placed in the data table 400, stored in the metadata 130, and the data record is placed in the data storage 110, indexed according to the ID/key 410. The data processor 120 can store compressed and/or uncompressed data in the data storage 110 and can compress uncompressed data to be stored in the data storage 110, for example.

Figure 7:
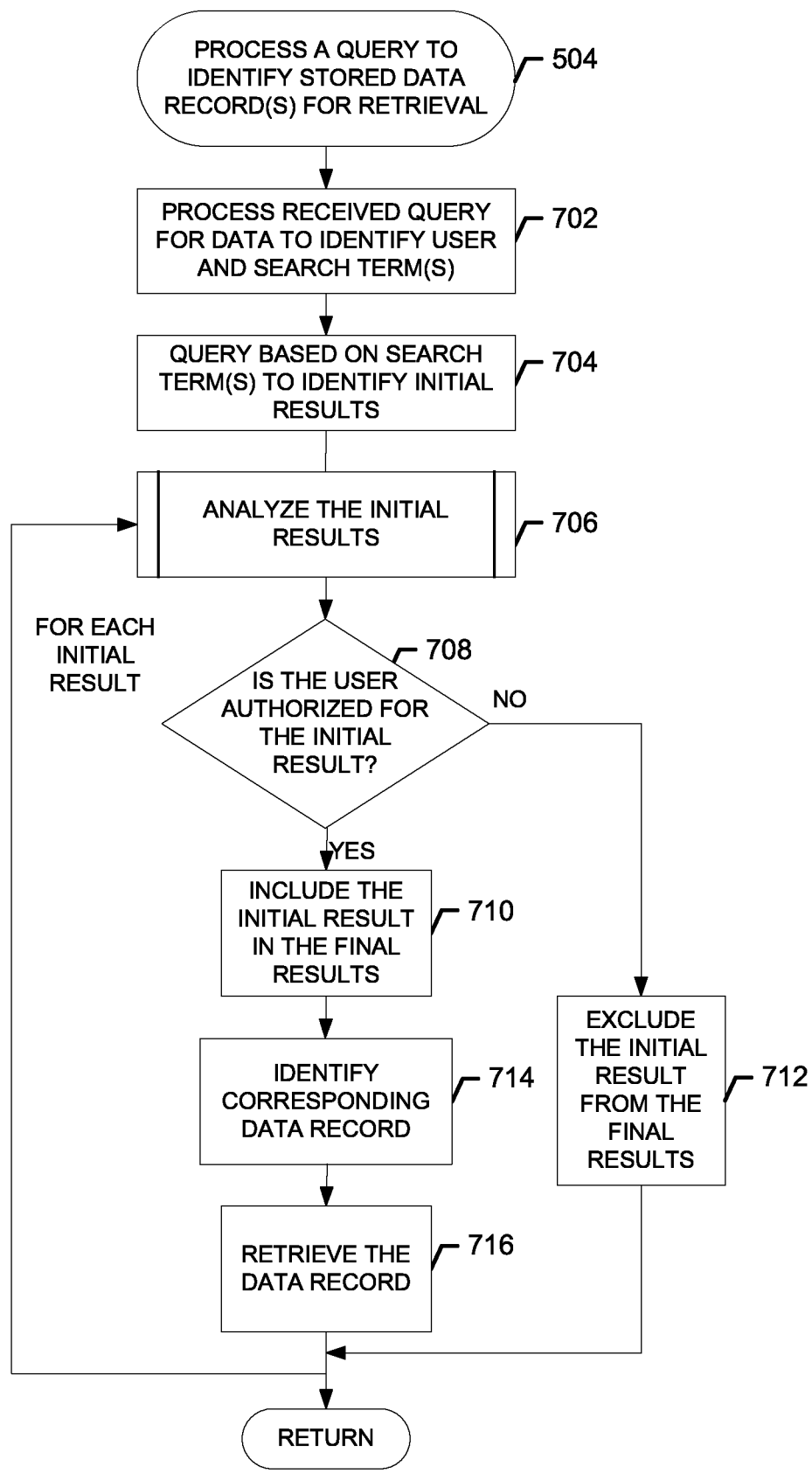

Additional detail associated with the processing of a query to identify stored data record(s) for retrieval (block 504) is shown in the example of FIG. 7. At block 702, a received query 145 for data is processed by the query handler 140 to identify a querying user and search terms included in the received query. For example, the received query 145 includes one or more query terms for searching to identify one or more data records from the data storage 110. The query handler 140 parses the received query 145 to identify those term(s) in the received query and extracts them to be used to search the data storage 110 and metadata 130 for corresponding data record(s). The query handler 140 also parses the received query 145 to extract an identification of the querying user and/or other identification associated with the received query. For example, the received query 145 may include a user ID 310, a privilege tag 320, and/or other indication of the querying user.

At block 704, the query is conducted by the query handler 140 based on the extracted search term(s) to identify initial results. For example, the one or more search terms extracted by the query handler 140 from the received query are used to search the data storage 110 and/or metadata 130 (e.g., the data table 400) to identify one or more data records related to the search term(s).

At block 706, each of the initial results is analyzed by the access filter 150 to remove results to which the querying user is not permitted access. For example, the initial results are filtered based on the column including security tag 420 information. Thus, data results can remain compressed but the security tag 420 column in the data table 400 can be used to filter the initial results to only capture those data records for which the querying user has access. That is, the security tag 420 for an initial result can be compared in bit operation (e.g., AND operation, etc.) to the privilege tag 320 for the querying user (e.g., based on user ID 310) to determine whether the user has permission to access that result.

At block 708, the bit operation (e.g., binary AND, OR, XOR, NOT, etc.) is reviewed to determine whether the querying user is authorized to access the initial result. If the result of the AND operation is non-zero, for example, then the querying user is authorized to access the initial result. If the user is authorized to access the initial result, then, at block 710, that initial result is included in the final query results because the user has access to that record.

However, if the AND operation is zero, for example, then the user is not authorized to access the initial result. If the user is not authorized to view the initial result, then, at block 712, that initial result is excluded from the final query results because the user does not have access to that record.

While zero and non-zero are used for purposes of example, results can instead be reversed to allow access with a zero bitwise output and deny access with a non-zero bitwise result. Thus, the comparison and analysis of blocks 706-712 can be viewed as a comparison which satisfies or does not satisfy a threshold or binary comparison value.

At block 714, a data record corresponding to the result for which the user has access is identified in the data table 400. For example, the ID/key 410 associated with the data record 401, 402 is identified. At block 716, the data record is retrieved by the data retriever 160 from the data storage 110 using the ID/key 410. The retrieved data record can then be provided as part of the query result output 165 (e.g., at block 506).

In certain examples, an order of the blocks in FIG. 7 can change to provide query results to which the requesting user has access. For example, the data storage 110 can first be queried to retrieve data records to which the querying user has access. With that as the initial results set, a keyword or search term query can be executed to identify relevant results from within the results to which the querying user has access, forming the final results to be output, for example.

Figure 8:
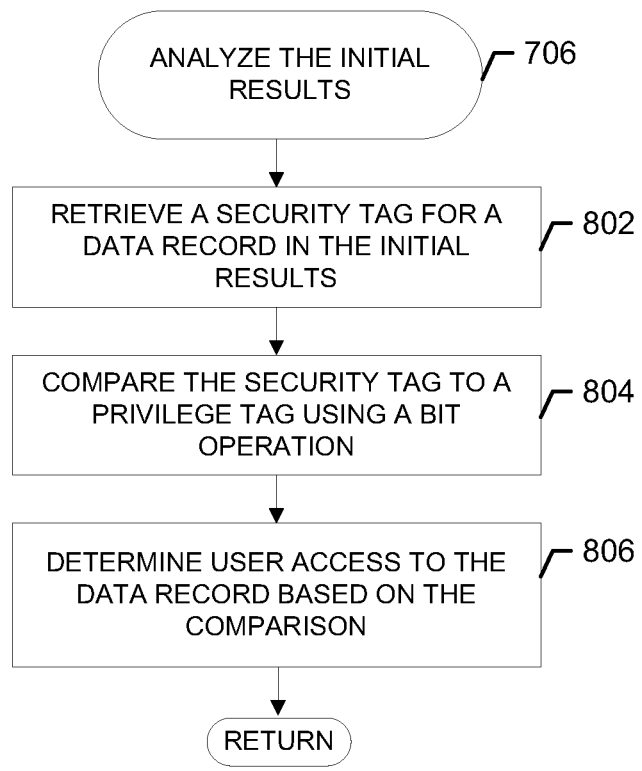

Additional detail associated with the processing of a query to identify stored data record(s) for retrieval (block 504) is shown in the example of FIG. 8. Each of the initial results is analyzed by the access filter 150 to remove results to which the querying user is not permitted access. At block 802, the security tag 420 is retrieved for a data record in the initial results. That is, the initial results are filtered based on a column including security tag 420 information. Thus, data results can remain compressed but the security tag 420 column in the data table 400 can be used to filter the initial results to only capture those data records for which the querying user has access.

At block 804, the security tag 420 for the data record is compared in bit operation (e.g., AND operation, etc.) to the privilege tag 320 for the querying user (e.g., based on user ID 310) to determine whether the user has permission to access that result. For example, the data record's security tag 420 is compared bit-by-bit to the privilege tag 320 to generate a value that is used to determine user access.

At block 806, the querying user's access to the data record is determined based on the result of the bit operation comparison. If the result of the AND operation is non-zero, for example, then the querying user is authorized to access the initial result.

For example, if the data record's security tag 420 is '100', a user in group1 having a privilege tag 320 of '001' does not have access to the data record (100 AND 001=000) with a zero result of the bit operation. Similarly, user in group2 having a privilege tag 320 of '010' does not have access to the data record (100 AND 010=000) with a zero result of the bit operation. However, a user in group3 having a privilege tag 320 of '100' does have access to the data record (100 AND 100=100) with a non-zero result.

Control then returns to block 708 of the example of FIG. 7, at which user authorization determines whether or not the data record from the initial results is included in the final query results. The example process of block 706 (and associated FIG. 8) repeats for each data record in the initial results to determine the final query results.

Figure 9:
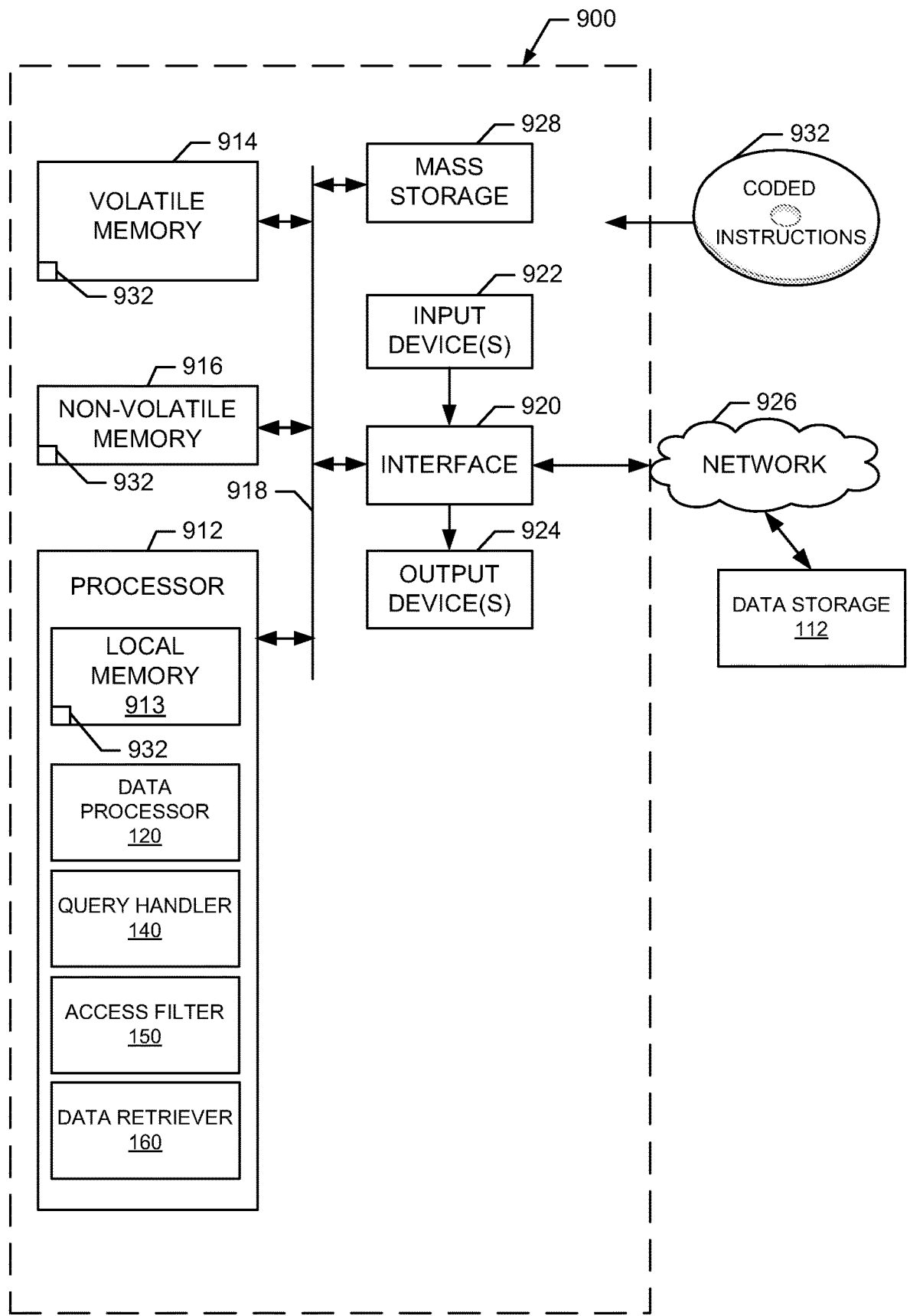
FIG. 9 is a schematic illustration of an example processor platform that may execute the instructions of FIGS. 5-8 to implement the example systems of FIGS. 1-4.

FIG. 9 is a block diagram of an example processor platform 900 capable of executing the instructions of FIGS. 5-8 to implement the systems of FIGS. 1-4. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. In the illustrated example, the processor 912 implements and/or is structured to include the example data processor 120, the example query handler 140, the example access filter 150, the example data retriever 160, etc.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a peripheral component interconnect (PCI) express interface.

In the illustrated example, one or more input devices 922 are connected to the interface circuit 920. The input device(s) 922 permit(s) a user to enter data and commands into the processor 912. The input device(s) 922 can be implemented by, for example, an audio sensor, a microphone, a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 5-8 may be stored in the mass storage device 928, in processor memory 913, in the volatile memory 914, in the non-volatile memory 916, and/or on a removable tangible computer readable storage medium such as a CD or DVD. In certain examples, the data storage 110, distributed data storage 112, the metadata 130, etc., can be implemented via one or more of the memory/storage 913, 914, 916, 928. As shown in the example of FIG. 9, the distributed data storage 112 can extend beyond the processing system 900 of FIG. 9.

From the foregoing, it will be appreciated that the above disclosed methods, apparatus and articles of manufacture facilitate faster, more secure analysis of large amounts of data by storing unindexed data in columnar format with compression. Rather than record-by-record analysis of entire records, columns are used to narrow a subset of results, and a key is used to retrieve the real record from the subset of results. Using a bit-map binary value to determine access/authorization, a processor can use one to two bytes to identify all available records, which is a significant savings in bandwidth and access time over a more detailed record-by-record string-parsing query analysis. Using a bit map of a binary integer rather than a long string, an authorization process does not need to parse or translate the data; instead, a bit operation such as an AND operation is performed on the actual stored data value, regardless of whether or not the value is compressed.

In certain examples, organizing a security tag bit map in a hierarchy structure can support unlimited groups in a data set. Putting security tags in a hierarchy tree (e.g., human resources may only include one or two groups, research and development may include a few more, etc.) based on an optional department tag can accelerate identification and evaluation of a subset of data records in a "big data" store.

In certain examples, a department tag is provided. The department tag can be used to create a hierarchy for a more targeted lookup of data. If millions of groups are available, the department tag can be used as a secondary hierarchy to separate the groups.

Certain examples can be applied to any big data platform (e.g., any Hadoop platform, etc.) and are not platform specific.

In certain examples, any key value, not only a security tag, can be used as a filter to retrieve a subset of data (e.g., belongs to Oregon State, etc.).

In certain examples, an index can be implemented for specific column(s). For example, an index can be provided for a "last name" column. For example, a "last name" field can be hashed to generate a bit map, and the bit map can be saved into a new field called "index tag" for each record (e.g., similar to a security tag). For example, last name="Yang" generates an index tag='0101'. Search content is also hashed into a bit map (e.g., "search tag") using the same hash function from the last name field. The search tag is similar to the privilege tag and can be compared with the index tag to determine access authorization. For example, a query can be used to select data records in which the last name is 'Yang' by hashing the alphanumeric text string "Yang" and querying by the search tag of '0101' generated from the hashing. The index tag and search tag are compared using a bit operation to return records with matching tags, for example. Thus, in certain examples, rather than metadata tables 130, a hash function and conversion from text query (e.g., last name) to a search tag query are provided by the query handler 140 and/or access filter 150.

In certain examples, the bit or bitwise operation includes an AND, OR, XOR, NOT, etc., binary operation yielding one or more binary outcomes for comparison to determine whether the user/group is allowed or excluded from access. In certain examples, rather than a permissive list of groups, a negate/exclude access list can be provided.

For example, assume that group1='001', group2='010', and group3='100'. If a first data record has a security tag of '101' and an exclude tag of '100', then group1 (001) is the only group that has access to the record by combining two AND operations (e.g., '101 AND 001>0' and '100 AND 001==0' indicating that group1 is allowed based on the security tag and not excluded by the exclude tag). If a second data record has a security tag of '111' and an exclude tag of '101', then group2 (010) is the only group that has access to the record by combining two AND operations (e.g., '111 AND 010>0' and '101 AND 010==0' indicating that group2 is allowed based on the security tag and not excluded by the exclude tag).

As another example, access can be evaluated based on an "AND>0 and greater than" operation. That is, a group with a higher-bit privilege tag can access a record with a lower-bit security tag (e.g., privilege tag>security tag). Thus, for example, assuming that group1='001', group2='010', and group3='100, and a third example data record has a security tag of '100', then only group3 has access (e.g., the privilege tag for group3 is greater than group2 and group1). If a fourth example data record has a security tag of '101', then group3 and group1 have access. If a fifth example data record has a security tag of '010', then group3 and group2 both have access because the privilege tag comparison to the security tag grants group2 access, and group3 has a privilege tag that is greater than the privilege tag for group2. If a sixth example data record has a security tag of '001', then all groups have access because the bit operation between security and privilege tags indicates that group1 has access, and both group2 and group3 have privilege tags that are greater than that of group1.

While zero and non-zero are used for purposes of example, results can instead be reversed to allow access with a zero bitwise output and deny access with a non-zero bitwise result. Thus, the comparison and analysis can be viewed as a comparison which satisfies or does not satisfy a threshold or binary comparison value.

Certain examples provide columnar storage, which records data column by column rather than row by row. For example, rather than storing rows of records enumerating name, age, address, etc., records can be stored listing all names in a first column, all ages in a second column, and all addresses in a third column. Using columnar storage, all values in a given column are of the same type. As a result, generic compression has greater effectiveness, and type-specific compression strategies can be applied. Since compression algorithms perform better on data having low information entropy (e.g., high data value locality), data of the same type (e.g., names, addresses, roles, etc.) have greater similarity in a column than data organized in a row across different data types. For at least these reasons, columnar data can be better compressible than its row data alternative.

Additionally, a processor querying the data set can focus on one or more columns including data of interest. Other columns can be ignored for the query. By focusing on a subset of one or more columns, data query processing and associated latency can be reduced through faster reads of smaller amounts of data from disk and/or other data storage as well as faster processing of such retrieved data. For example, if the data is compressed, then less processing time is used in data transfer from disk to memory and/or from a memory processor.

Without indexing, a full scan of row data involves reading every byte of a data table from the disk. Since data storage is typically organized without an index, columnar storage provides a significant performance and accuracy improvement over row-by-row data querying. In addition to being able to target particular columns of a particular type in a big data set, columnar querying allows more efficient reading of entire columns at once. Furthermore, if compressed columnar data can be processed directly for a query without decompression, then additional performance gains (e.g., faster processing speed, reduced data latency, etc.) can be realized. In some examples, multiple columns of compressed data can be processed for a query in parallel. Such parallel processing is often infeasible for a row-by-row analysis.

Example 1 is an apparatus including a data storage including a memory adjusted to store data organized according to a data table including columns identifying a first data record and a first security tag associated with the first data record. In example 1, retrieval of data from the data storage involves a bit operation comparing the first security tag with a first privilege tag. In example 1, the data storage provides the first data record when the bit operation comparing the first security tag with the first privilege tag has a non-zero result, and the data storage does not provide the first data record when the bit operation comparing the first security tag with the first privilege tag has a zero result.

Example 2 includes the subject matter of example 1, wherein the bit operation includes an AND operation.

Example 3 includes the subject matter of example 1, wherein the memory of the data storage is adjusted to store the data as a data record associated with a key for data retrieval, and wherein the data table includes a first key associated with the first data record.

Example 4 includes the subject matter of example 1, wherein the data stored in the data storage includes compressed data.

Example 5 includes the subject matter of example 4, wherein the bit operation is performed with respect to the compressed data without uncompressing the data.

Example 6 includes the subject matter of example 1, wherein the data is queried based on an analysis of a security tag column including the first security tag.

Example 7 includes the subject matter of example 1, further including a query handler to parse a received query to identify a querying user and one or more search terms.

Example 8 includes the subject matter of example 7, further including an access filter to filter query results based on the bit operation comparing the first security tag with the first privilege tag.

Example 9 includes the subject matter of example 1, further including a user table associating a user identifier with a privilege tag, the privilege tag indicating one or more groups to which the user belongs.

Example 10 includes the subject matter of example 9, further including a group table associating a group with a bit map representing the group in the privilege tag.

Example 11 includes the subject matter of example 1, wherein the data storage is to provide a second data record when the bit operation comparing a second security tag with the first privilege tag has a non-zero result and the data storage not providing the second data record when the bit operation comparing the second security tag with the first privilege tag has a zero result.

Example 12 is a method including retrieving a first security tag from a data table identifying a first data record and the first security tag associated with the first data record, the first data record stored in a data storage. The method of example 12 includes comparing, using a bit operation, a first security tag with a first privilege tag. The method of example 12 includes providing the first data record when the bit operation comparing the first security tag with the first privilege tag has a non-zero result. The method of example 12 includes not providing the first data record when the bit operation comparing the first security tag with the first privilege tag has a zero result.

Example 13 includes the subject matter of example 12, wherein the bit operation includes an AND operation.

Example 14 includes the subject matter of example 12, further including adjusting the data storage to store the data as a data record associated with a key for data retrieval, wherein the data table includes a first key associated with the first data record.

Example 15 includes the subject matter of example 12, wherein the data stored in the data storage includes compressed data.

Example 16 includes the subject matter of example 14, wherein the bit operation is performed with respect to the compressed data without uncompressing the data.

Example 17 includes the subject matter of example 12, further including querying for data based on an analysis of a security tag column in the data table including the first security tag.

Example 18 includes the subject matter of example 12, further including receiving a query; and parsing the received query to identify a querying user and one or more search terms.

Example 19 includes the subject matter of example 12, further including associating, via a user table, a user identifier with a privilege tag, the privilege tag indicating one or more groups to which the user belongs.

Example 20 includes the subject matter of example 19, further including associating, via a group table, a group with a bit map representing the group in the privilege tag.

Example 21 is a tangible computer readable storage medium comprising computer readable instructions which, when executed, cause a processor to at least retrieve a first security tag from a data table identifying a first data record and the first security tag associated with the first data record, the first data record stored in a data storage. The instructions of example 21, when executed, cause the processor to at least compare, using a bit operation, a first security tag with a first privilege tag. The instructions of example 21, when executed, cause the processor to at least provide the first data record when the bit operation comparing the first security tag with the first privilege tag has a non-zero result. The instructions of example 21, when executed, cause the processor to at least not provide the first data record when the bit operation comparing the first security tag with the first privilege tag has a zero result.

Example 22 includes the subject matter of example 21, wherein the bit operation includes an AND operation.

Example 23 includes the subject matter of example 22, wherein the bit operation further includes a bit comparison to an exclude access list.

Example 24 includes the subject matter of example 22, wherein the bit operation further includes a greater than privilege tag comparison.

Example 25 includes the subject matter of example 21, wherein the bit operation includes at least one of a binary AND operation, a binary OR operation, a binary XOR operation, or a binary NOT operation.

Example 26 includes the subject matter of example 21, wherein the instructions, when executed, further cause the processor to at least adjust the data storage to store the data as a data record associated with a key for data retrieval, wherein the data table includes a first key associated with the first data record.

Example 27 includes the subject matter of example 21, wherein the data stored in the data storage includes compressed data.

Example 28 includes the subject matter of example 27, wherein the bit operation is performed with respect to the compressed data without uncompressing the data.

Example 29 includes the subject matter of example 21, wherein the instructions, when executed, further cause the processor to at least query for data based on an analysis of a security tag column in the data table including the first security tag.

Example 30 includes the subject matter of example 21, wherein the instructions, when executed, further cause the processor to at least receive a query; and parse the received query to identify a querying user and one or more search terms.

Example 31 includes the subject matter of example 21, wherein the instructions, when executed, further cause the processor to at least associate, via a user table, a user identifier with a privilege tag, the privilege tag indicating one or more groups to which the user belongs.

Example 32 includes the subject matter of example 31, wherein the instructions, when executed, further cause the processor to at least associate, via a group table, a group with a bit map representing the group in the privilege tag.

Example 33 is a device including a means for retrieving a first security tag from a data table identifying a first data record and the first security tag associated with the first data record, the first data record stored in a data storage. Example 33 includes a means for comparing, using a bit operation, a first security tag with a first privilege tag. Example 33 includes a means for providing the first data record when the bit operation comparing the first security tag with the first privilege tag has a non-zero result and not providing the first data record when the bit operation comparing the first security tag with the first privilege tag has a zero result.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a data storage to store data organized according to a data table including a first column to store a first data record and a second column to store a first security tag associated with the first data record, the first security tag including a bit map representing a plurality of groups and indicating an access associated with the plurality of groups; and
a processor to at least:
retrieve data from the data storage using a bit operation of the second column including the first security tag to compare bits of the bit map of the first security tag with bits of a first privilege tag, the first privilege tag built based on the plurality of groups of the first security tag and indicating a membership in the plurality of groups;
provide the first data record when the bit operation comparing the first security tag with the first privilege tag has a first result; and
not provide the first data record when the bit operation comparing the first security tag with the first privilege tag has a second result.

2. The apparatus of claim 1, wherein the bit operation includes an AND operation.

3. The apparatus of claim 1, wherein the data storage is adjusted to store the data as a data record associated with a key for data retrieval, and wherein the data table includes a first key associated with the first data record.

4. The apparatus of claim 1, wherein the data stored in the data storage includes compressed data.

5. The apparatus of claim 4, wherein the bit operation is performed with respect to the compressed data without uncompressing the data.

6. The apparatus of claim 1, wherein the data is queried based on an analysis of the second column including the first security tag.

7. The apparatus of claim 1, further including a query handler to parse a received query to identify a querying user and one or more search terms.

8. The apparatus of claim 7, further including an access filter to filter query results based on the bit operation comparing the first security tag with the first privilege tag.

9. The apparatus of claim 1, further including a user table associating a user identifier with the first privilege tag, the first privilege tag indicating one or more of the plurality of groups to which a user belongs.

10. The apparatus of claim 9, further including a group table associating the one or more plurality of groups with a bit map representing the one or more plurality of groups in the first privilege tag.

11. The apparatus of claim 1, wherein the data storage is to provide a second data record when the bit operation comparing a second security tag with the first privilege tag has a non-zero result and the data storage not providing the second data record when the bit operation comparing the second security tag with the first privilege tag has a zero result.

12. A method comprising:
retrieving a first security tag from a data table identifying a first data record and the first security tag associated with the first data record, the first data record stored in a data storage, the first security tag including a bit map representing a plurality of groups and indicating an access associated with the plurality of groups;
comparing, using a bit operation, bits of the bit map of the first security tag with a first privilege tag, the first privilege tag built based on the plurality of groups of the first security tag and indicating a membership in the plurality of groups;
providing the first data record when the bit operation comparing the first security tag with the first privilege tag has a first result; and
not providing the first data record when the bit operation comparing the first security tag with the first privilege tag has a second result.

13. The method of claim 12, wherein the bit operation includes an AND operation.

14. The method of claim 12, further including adjusting the data storage to store data as a data record associated with a key for data retrieval, wherein the data table includes a first key associated with the first data record.

15. The method of claim 12, wherein data stored in the data storage includes compressed data.

16. The method of claim 15, wherein the bit operation is performed with respect to the compressed data without uncompressing the data.

17. The method of claim 12, further including querying for data based on an analysis of a security tag column in the data table including the first security tag.

18. The method of claim 12, further including associating, via a user table, a user identifier with the first privilege tag, the first privilege tag indicating one or more of the plurality of groups to which a user belongs.

19. The method of claim 18, further including associating, via a group table, the one or more of the plurality of groups with a bit map representing the one or more of the plurality of groups in the first privilege tag.

20. The method of claim 12, further including:
receiving a query; and
parsing the received query to identify a querying user and one or more search terms.

21. A tangible computer readable storage medium comprising computer readable instructions which, when executed, cause a processor to at least:
retrieve a first security tag from a data table identifying a first data record and the first security tag associated with the first data record, the first data record stored in a data storage, the first security tag including a bit map representing a plurality of groups and indicating an access associated with the plurality of groups;
compare, using a bit operation, bits of the bit map of the first security tag with a first privilege tag, the first privilege tag built based on the plurality of groups if the first security tag and indicating a membership in the plurality of groups;
provide the first data record when the bit operation comparing the first security tag with the first privilege tag has a first result; and
not provide the first data record when the bit operation comparing the first security tag with the first privilege tag has a second result.

22. The computer readable storage medium of claim 21, wherein the bit operation includes an AND operation.

23. The computer readable storage medium of claim 21, wherein the instructions, when executed, further cause the processor to at least adjust the data storage to store data as a data record associated with a key for data retrieval, wherein the data table includes a first key associated with the first data record.

24. The computer readable storage medium of claim 21, wherein data stored in the data storage includes compressed data.

25. The computer readable storage medium of claim 24, wherein the instructions, when executed, further cause the processor to perform the bit operation with respect to the compressed data without uncompressing the data.

26. The computer readable storage medium of claim 21, wherein the instructions, when executed, further cause the processor to at least query for data based on an analysis of a security tag column in the data table including the first security tag.

27. The computer readable storage medium of claim 21, wherein the instructions, when executed, further cause the processor to at least:
receive a query; and parse the received query to identify a querying user and one or more search terms.

28. The computer readable storage medium of claim 21, wherein the instructions, when executed, further cause the processor to at least associate, via a user table, a user identifier with the first privilege tag, the first privilege tag indicating one or more of the plurality of groups to which the user belongs.

29. The computer readable storage medium of claim 21, wherein the instructions, when executed, further cause the processor to at least associate, via a group table, the one or more plurality of groups with a bit map representing the one or more of the plurality of groups in the first privilege tag.

* * * * *